Jan. 27, 1931.  H. PHILLIPS  1,790,282
BAND SAW
Filed May 29, 1930
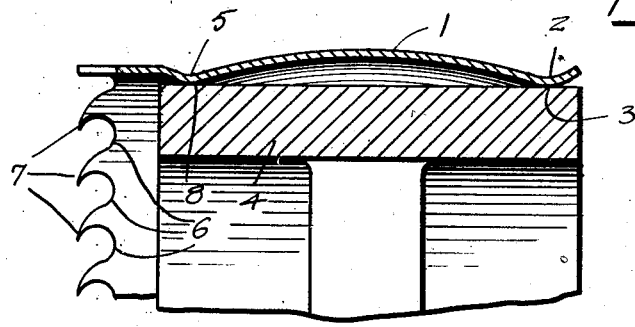
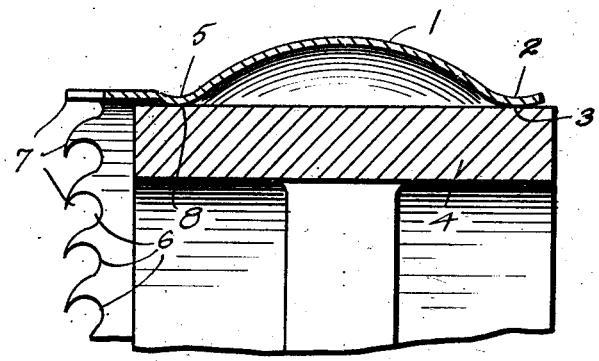
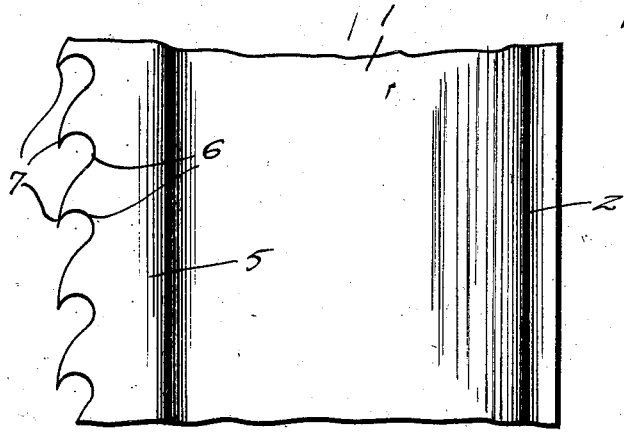
Inventor
Hugo Phillips
By Watson E. Coleman
Attorney Patented Jan. 27, 1931

1,790,282

UNITED STATES PATENT OFFICE

HUGO PHILLIPS, OF HYDESVILLE, CALIFORNIA

BAND SAW

Application filed May 29, 1930. Serial No. 457,389.

This invention relates to improvements in band saws and pertains particularly to an improved method of tensioning a saw.

The primary object of the present invention is to provide a band saw which is so tensioned that the cracking of the saw at the back edge and at the gullets of the teeth will be prevented.

Another object of the invention is to provide a band saw so tensioned that in addition to preventing the cracking or spreading of the saw at the front and rear edges the saw will be properly maintained in position upon its supporting pulleys.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in cross-section of a saw constructed in accordance with the present invention and a portion of a supporting pulley therefor.

Figure 2 is a view similar to Figure 1 showing the alteration occuring in the cross-sectional design of the saw after a period of use.

Figure 3 is a view in plan of a portion of a band saw constructed in accordance with the present invention.

As is, of course, well known to those familiar with the art to which the present invention relates, band saws are tensioned before being placed into service and this tensioning consists in giving to the saw a transverse arcuate contour which, in saws of a width of fourteen inches, conforms to a segment of a forty-five foot circle. When the saw is placed in service the rear edge bears firmly against the periphery of the supporting wheel while the front or toothed edge projects a slight distance beyond the adjacent corner of the wheel. The drag to which the saw is subjected when in use places a severe strain upon the rear edge and upon the front edge at the gullets of the teeth and this results in a cracking of the saw.

In carrying out my invention I provide a saw such as that indicated generally by the numeral 1 which in addition to having the usual transversely arcuate contour imparted thereto in the manner shown is formed at the rear edge to provide a reversely curved portion 2 which forms a rounded inner face 3 which rests upon the periphery of the pulley 4 over which the saw passes so that the edge of the saw does not come into contact with the pulley face.

In addition to forming the reversely curved portion 2 adjacent the rear edge of the saw I terminate the main arc upon which the saw is formed in the usual tensioning process at the point 5 which, in a saw of a width of fourteen inches, comes within approximately one inch of the gullets 6 of the teeth 7. At this point 5 a slight curve is formed reversely to the main tension curve of the saw, or in other words the same as the curved portion 2 so that the under face is formed to provide a rounded tread 8 which rests upon the periphery of the pulley wheel 4 at the front edge thereof, in the manner shown.

From the foregoing it will be seen that with a saw constructed in accordance with my invention there are provided two surfaces which extend longitudinally of the saw, which come into contact with the surface of the pulley 4 over which the saw passes, these surfaces being indicated by the numerals 3 and 8. As these rounded surfaces, which may be termed treads or tires, are disposed inwardly from the adjacent edges of the saw it will be apparent that a great deal of the strain normally borne by the edges of saws of the character at present in use and which results in cracking of these saws, will be relieved and thus practically eliminate the formation of edge cracks.

Another benefit derived from forming a saw in the manner described is that the proper tension of the saw will be maintained for a longer period of time than in saws of the character at present in use thus saving a great deal of bench work in connection with the maintenance of saws in proper condition.

After running a saw for approximately three weeks it will be found that instead of being tensioned to conform to the arc of a forty-five foot circle as when first placed upon the machine, the saw will have tensioned itself to a point where it will conform substantially to the curvature of a thirty-five foot circle as illustrated in Figure 2 thus drawing the edges closer to the surface of the pulley. The saw may then be taken to the bench and given a light roll to restore it to the proper curve or tension thus restoring the rounded front and rear curves or tires which contact with the surface of the supporting pulleys.

From the foregoing description it will be readily seen that by constructing a saw in accordance with the present invention besides preventing contact of the edges of the saw with the pulley body and thus preventing the formation of cracks in the saw, the saw will tend to tension itself on the wheel thus further separating the periods when it will be necessary for the saw filer to remove the saw to the work bench for retensioning.

Having thus described my invention, what I claim is:

1. An improved band saw having a transverse tension curve, formed to provide at points inwardly of each edge thereof a pulley engaging tire having the pulley contacting surface curved oppositely to the tension curve of the saw.

2. An improved band saw having a transverse tension curve, said transverse tension curve terminating inwardly of each edge of the saw and merging with an oppositely curved portion adapted to engage the supporting surface of a wheel to maintain the adjacent edge of the saw free from contact with the wheel.

3. An improved band saw having a circumferential inwardly extending rim engaging tread positioned adjacent each edge and acting to maintain the adjacent edge free from contact with a supporting pulley.

4. An improved band saw having means adjacent each edge extending inwardly from the path of travel of the teeth thereof for contact with a supporting pulley, for the purpose described.

In testimony whereof I hereunto affix my signature.

HUGO PHILLIPS.